United States Patent
Masaki et al.

(10) Patent No.: US 6,831,714 B2
(45) Date of Patent: Dec. 14, 2004

(54) PROTECTIVE DIFFUSION FILM, PROCESS FOR PRODUCING THE SAME, SURFACE LIGHT SOURCE DEVICE, AND LIQUID CRYSTAL DISPLAY DEVICE

(75) Inventors: Tadahiro Masaki, Tokyo-To (JP); Taiji Suga, Tokyo-To (JP); Fumihiro Arakawa, Tokyo-To (JP)

(73) Assignee: Dai Nippon Printing Co., Ltd. (JP)

( * ) Notice: Subject to any disclaimer, the term of this patent is extended or adjusted under 35 U.S.C. 154(b) by 306 days.

(21) Appl. No.: 09/871,706

(22) Filed: Jun. 4, 2001

(65) Prior Publication Data

US 2002/0033915 A1 Mar. 21, 2002

(30) Foreign Application Priority Data

Jun. 2, 2000 (JP) .......................................... 2000-165791
Jul. 21, 2000 (JP) .......................................... 2000-220093

(51) Int. Cl.$^7$ ............................................. G02F 1/335
(52) U.S. Cl. ........................... 349/112; 349/96; 349/64; 349/95; 359/599; 359/615; 359/494; 359/500; 359/453; 359/495; 359/247
(58) Field of Search .................................. 349/112, 113, 349/111

(56) References Cited

U.S. PATENT DOCUMENTS

| | | | |
|---|---|---|---|
| 4,152,618 A | * | 5/1979 | Abe et al. .................... 313/116 |
| 4,998,804 A | * | 3/1991 | Horiuchi ...................... 350/334 |
| 5,557,433 A | * | 9/1996 | Maruyama et al. ............ 359/41 |
| 5,600,456 A | * | 2/1997 | Maruyama et al. ........... 349/64 |
| 5,903,391 A | * | 5/1999 | Toshima et al. ............. 359/599 |
| 6,111,696 A | * | 8/2000 | Allen et al. .................. 359/495 |
| 6,123,431 A | * | 9/2000 | Teragaki et al. .............. 362/31 |
| 6,364,497 B1 | * | 4/2002 | Park et al. ..................... 362/31 |
| 6,515,785 B1 | * | 2/2003 | Cobb, Jr. et al. ............ 359/247 |
| 6,556,347 B1 | * | 4/2003 | Murayama et al. ......... 359/453 |

* cited by examiner

Primary Examiner—Nathan J. Flynn
Assistant Examiner—Fazli Erdem
(74) Attorney, Agent, or Firm—Parkhurst & Wendel, L.L.P.

(57) ABSTRACT

Disclosed are a protective diffusion film, which does not scratch a lens film and a liquid crystal display device, does not become a refuse source or the like, and also has a suitable level of concealment effect, a process for producing the same, a surface light source device, and a liquid crystal display device. This protective diffusion film is used in a surface light source device provided with a lens film wherein the protective diffusion film is provided on a light outgoing surface of the lens film, and comprises: a transparent substrate layer; and a protective diffusion layer which is provided on the transparent substrate layer in its surface at least on the lens film side, has fine concaves and convexes on its surface, protects members which come into contact with the protective diffusion film, and is light diffusive.

14 Claims, 4 Drawing Sheets

PROTECTIVE DIFFUSION FILM, PROCESS FOR PRODUCING THE SAME, SURFACE LIGHT SOURCE DEVICE, AND LIQUID CRYSTAL DISPLAY DEVICE

BACKGROUND OF THE INVENTION

1. Field of the invention

The present invention relates to a protective diffusion film provided on the light outgoing surface side of a lens film, and more particularly to a protective diffusion film, a process for producing the same, a surface light source device, and a liquid crystal display device, which have been improved in scratch resistance.

2. Background Art

FIG. 5 is a cross-sectional view of a liquid crystal display device 135 provided with a surface light source device 120 which is an edge-type flat light source as an example of a surface light source device using a conventional protective diffusion film.

The surface light source device 120 comprises, for example, a light source 121, a light guide plate 122, reflection film 124, a light diffusive film 125, a lens film 140, and a protective diffusion film 110.

The light guide plate 122 is surface light projection means, and has a light source 121 on its side end and, on its non-light-outgoing surface remote from a light outgoing surface 122a, a dot pattern 123 for diffusing light from the light source 121 and directing the light to a light outgoing direction. The reflection film 124 is provided on the non-light-outgoing surface side of the light guide plate 122, and functions to block off light beams which go out to unnecessary directions and, at the same time, to reflect and return light beams to a predetermined direction.

A lens film 140 is disposed on the light outgoing surface 122a side of the light guide plate 122 through a diffusing plate 125, which diffuses light to conceal the dot pattern 123, in such a manner that the lens film 140 on its prism surface faces the light outgoing surface side.

A protective diffusion film 110 is provided on the light outgoing surface side of the lens film 140. This protective diffusion film: 110 prevents the prism 140a and the liquid crystal display device 133 from coming into direct contact and being scratched with each other, for example, due to vibration in transit. The protective diffusion film 110 also has the effect of slight light diffusion for concealing stripes of the prism 140a in the lens film 140, a spacer (not shown), and the like. To this end, the protective diffusion film has been formed by incorporating, in a dispersed state, organic or inorganic beads as a light diffusing agent into a transparent resin substrate, or by coating an ink containing organic or inorganic beads as a diffusing agent onto a transparent resin substrate.

A transmission liquid crystal display device 133 comprising a liquid crystal layer 130 sandwiched between a lower substrate 132 and an upper substrate 131 is provided on the light outgoing side of the surface light source device 120, and the liquid crystal display device 133 is illuminated from backside by the surface light source device 120.

Since, however, .the protective diffusion film 110 used in the above-described conventional device uses beads as a diffusing agent, the beads disadvantageously scratch the lens film 140 and the liquid crystal display device 133.

Another problem of the conventional device is such that the beads separate from the film and the separated beads enter between the prisms 140a in the lens film 140 and thus cause a change in optical characteristics or create a shadow.

SUMMARY OF THE INVENTION

Accordingly, it is an object of the present invention to provide a protective diffusion film, which does not scratch a lens film and a liquid crystal display device, does not become a refuse source or the like, and also has a suitable level of concealment effect, a process for producing the same, a surface light source device, and a liquid crystal display device.

The above object of the present invention can be attained by the following means. In this connection, it should be noted that although, for facilitating the understanding of the present invention, the present invention will be described using reference characters corresponding to embodiments of the present invention, the present invention is not limited to this.

Specifically, the protective diffusion film according to the first aspect of the present invention is a protective diffusion film (10) for use in a surface light source device (20) provided with a lens film (40), wherein said protective diffusion film (10) is provided on a light outgoing surface of the lens film, said protective diffusion film (10) comprising:

a transparent substrate layer (11); and a protective diffusion layer (13A, 13B) which is provided on the transparent substrate layer in its surface at least on the lens film side, has fine concaves and convexes on its surface, protects members which come into contact with the protective diffusion film, and is light diffusive.

According to a preferred embodiment of the present invention, the protective diffusion film (10) has a haze of 15 to 50.

According to a preferred embodiment of the present invention, the surface of the protective diffusion layer (13A, 13B) has a ten-point mean roughness Rz of 0.5 to 6 $\mu$m.

According to a preferred embodiment of the present invention, the number of profile peaks in the concaves and convexes in the protective diffusion layer (13A, 13B) is 2 to 15 as measured under conditions of a reference length of 0.8 mm and a count level of ±0.1 $\mu$m.

According to a preferred embodiment of the present invention, the number of profile peaks is counted by a Pc1 method.

According to a preferred embodiment of the present invention, the protective diffusion layer (13A, 13B) contains a cured product of an ionizing radiation-curable resin (82).

The protective diffusion film according to the second aspect of the present invention is a protective diffusion film (10) for use in a surface light source device (20) provided with a lens film (40), wherein said protective diffusion film (10) is provided on a light outgoing surface of the lens film, said protective diffusion film comprising:

a transparent substrate layer (11);

a first protective diffusion layer (13B) which is provided on the transparent substrate layer in its surface on the lens film side, has fine concaves and convexes on its surface, protects members which come into contact with the protective diffusion film, and is light diffusive; and a second protective diffusion layer (13A) which is provided on the transparent substrate layer in its side remote from the first protective diffusion layer, has fine concaves and convexes on its surface, protects members which come into contact with the protective diffusion film, and is light diffusive.

According to a preferred embodiment of the present invention, the protective diffusion film (10) has a haze of 15 to 50.

According to a preferred embodiment of the present invention, the surface of the first protective diffusion layer (13B) and/or the surface of the second protective diffusion layer (13A) has a ten-point mean roughness Rz of 0.5 to 6 μm.

According to a preferred embodiment of the present invention, the number of profile peaks in the concaves and convexes in the first protective diffusion layer (13B) or the second protective diffusion layer is 2 to 15 as measured under conditions of a reference length of 0.8 mm and a count level of ±0.1 μm.

According to a preferred embodiment of the present invention, the number of profile peaks in the concaves and convexes in the second protective diffusion layer (13A) or the first protective diffusion layer provided on the side opposite to the first protective diffusion layer (13B) or the second protective diffusion layer is 10 to 40 as measured under conditions of a reference length of 0.8 mm and a count level of ±0.1 μm.

According to a preferred embodiment of the present invention, the number of profile peaks is counted by a Pc1 method.

According to a preferred embodiment of the present invention, the protective diffusion layer (13A, 13B) contains a cured product of an ionizing radiation-curable resin (82).

According to the present invention, there is provided a process for producing the protective diffusion film, comprising the steps of:

shaping the ionizing radiation-curable resin into a desired shape by means of a cylinder plate (88) having a mold shape conforming to the shape of said concaves and convexes (step of shaping); and applying an ionizing radiation to the ionizing radiation-curable resin to form a cured product of the ionizing radiation-curable resin (step of curing).

Further, according to the present invention, there is provided a surface light source device (20) comprising:

a light source (21);

surface light projection means (22) for surface-projecting light, emitted from the light source, from a light projection surface (22a) to a predetermined direction;

a lens film (40) provided on the light projection surface; and the protective diffusion film (10), according to any one of claims 1 to 13, provided on the light outgoing surface side of the lens film.

Furthermore, according to the present invention, there is provided a liquid crystal display device (35) comprising:

a light source (21);

surface light projection means (22) for surface-projecting light, emitted from the light source, from a light projection surface (22a) to a predetermined direction;

a lens film (40) provided on the light projection surface;

the protective diffusion film (10), according to any one of claims 1 to 13, provided on the light outgoing surface side of the lens film; and a transmission liquid crystal display device (33) disposed on the light outgoing surface side of the protective diffusion film.

DETAILED DESCRIPTION OF THE INVENTION

Embodiments of the present invention will be described in more detail with reference to the accompanying drawings and the like.

Protective Diffusion Film According to First Aspect of Present Invention

Figure 1:
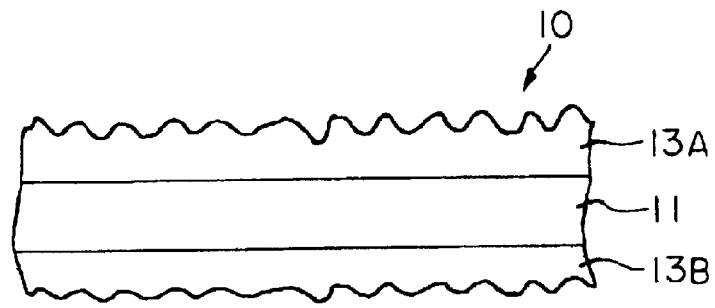
FIG. 1 is a partially enlarged cross-sectional view of a protective diffusion film according to the first aspect of the present invention.

FIG. 1 is a partially enlarged cross-sectional view of a protective diffusion film 10 according to the first aspect of the present invention.

The protective diffusion film 10 comprises a substrate film 11 and protective diffusion layers 13A, 13B provided respectively on both sides of the substrate film 11.

The substrate film 11 is a transparent substrate layer as a base, and may be formed of a stretched or unstretched film of a thermoplastic resin, such as cellulose triacetate, polyester, polyamide, polyimide, polypropylene, polymethyl pentene, polyvinyl chloride, polyvinyl acetal, polymethyl methacrylate, polycarbonate, or polyurethane. The thickness of the substrate film 11 is preferably 50 to 200 μm from the viewpoint of handleability, such as processability, although the thickness also varies depending upon the rigidity of the film. The substrate film, on its side where the protective diffusion layer; 13A, 13B is to be provided, is preferably subjected to easy-adhesion treatment, such as corona discharge treatment, from the viewpoint of highly stabilizing the adhesion to the protective diffusion layer 13A, 13B to be stacked.

The protective diffusion layer 13A, 13B is a layer which has on its surface fine concaves and convexes, protects members which come into contact with the protective diffusion film, and has concealment effect by virtue of a suitable level of light diffusion properties.

The protective diffusion layers 13A, 13B according to the embodiment of the present invention have a surface roughness of Rz=1.6 μm in terms of ten-point mean roughness Rz. Further, for the protective diffusion layers 13A, 13B according to the embodiment of the present invention, the roughness in terms of the number of profile peaks PC as measured by a Pc1 method under conditions of longitudinal magnification: 2000 times, lateral magnification: 50 times, reference length: 0.8 mm, phase characteristics: normal, feed rate: 0.1 mm/sec, and count level: ±0.1 μm is PC=8.

According to a preferred embodiment of the present invention, Rz is in the range of 0.5 to 6 μm, more preferably 1 to 6 μm, still more preferably 1 to 4 μm. When Rz is in the above defined range, the height of the concaves and convexes can be satisfactorily ensured to enhance the concealment effect while preventing an enhancement in the concealment effect to an unnecessary high level which deteriorates the optical properties. For the same reason, PC is preferably in the range of 2 to 15 as measured under the above conditions.

The protective diffusion film 10 has a suitable level of light diffusion properties by virtue of concaves and convexes provided on the surface of the protective diffusion layer 13A, 13B. A haze defined as the ratio of the luminance of an object to the luminance of the object as viewed through a scattering medium is used as a measure of the level of light diffusion. The haze of the protective diffusion film 10 according to the embodiment of the present invention is 30. The haze of the protective diffusion film is preferably in the range of 15 to 50, more preferably in the range of 20 to 40. When the haze is less than 15, the concealment effect is lowered and, consequently, cannot conceal, for example, minor deficiencies of or below the lens film. On the other hand, when the haze exceeds 50, the level of the concealment effect becomes excessively high, leading to lowered luminance.

Figure 2:
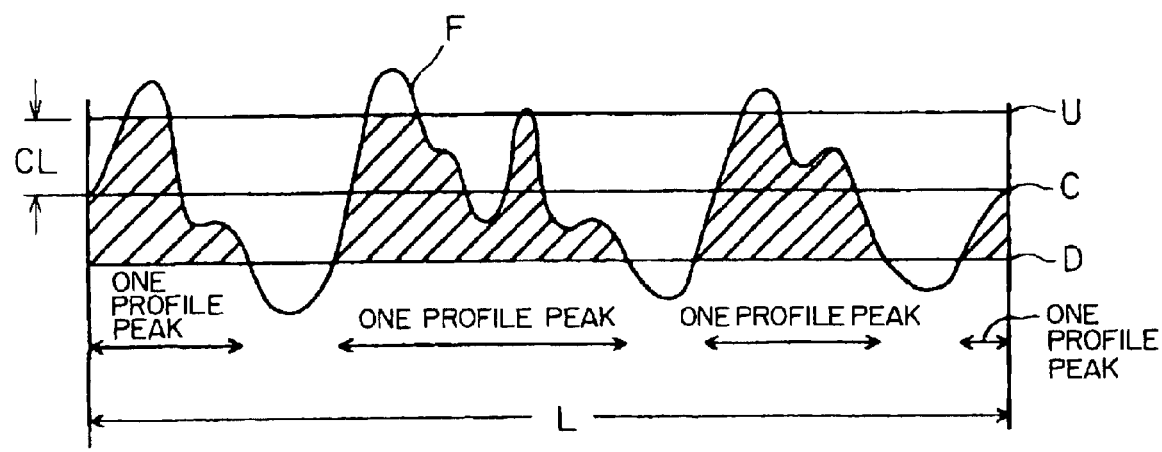
FIG. 2 is a diagram illustrating a Pc1 method.

FIG. 2 is a diagram illustrating a Pc1 method. In the Pc1 method, a count level CL is set, and two lines parallel to a center line C of a roughness curve F, an upper peak count level U and a lower peak count level D, are provided. In a portion between two points where the lower peak count level D crosses the roughness curve F, when one or more points, where the upper peak count level U crosses the roughness curve F, exist, this is counted as one profile peak. This count is carried out for a reference length L, and the surface roughness is expressed in terms of the count of the profile peaks. In the embodiment shown in FIG. 2, since there are four profile peaks, the roughness as measured by the Pc1 method is 4.

The protective diffusion layers 13A, 13B are formed from a composition containing a relatively large amount of an oligomer or a prepolymer of, for example, a (meth)acrylate (here "(meth)acrylate" referring to both acrylate and methacrylate) of a polyfunctional compound, such as a polyhydric alcohol, and a reactive diluent. Examples of the diluent include: monofunctional monomers, for example, ethyl (meth)acrylate, ethylhexyl (meth)acrylate, styrene, vinyltoluene, and N-vinylpyrrolidone; and polyfunctional monomers, for example, trimethylolpropane tri(meth)acrylate, hexanediol (meth)acrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth)acrylate, and neopentyl glycol di(meth)acrylate.

When the ionizing radiation-curable resin is used as an ultraviolet-curable, resin, a photopolymerization initiator, such as an acetophenone compound, a benzophenone compound, Michler's benzoyl benzoate, an α-amyloxime ester and thioxanthone, or a photosensitizer, such as n-butylamine, triethylamine and tri-n-butylphosphine, may be mixed in the ionizing radiation-curable resin.

Further, the ionizing radiation-curable resin may contain a reactive organosilicon compound represented by formula $R_mSi(OR')_n$ wherein R and R' each represent an alkyl group having 1 to 10 carbon atoms and m and n are each an integer satisfying m+n=4. Specific examples of organosilicon compounds include tetramethoxysilane, tetraethoxysilane, tetra-iso-propoxysilane, tetra-n-propoxysilane, tetra-n-butoxysilane, tetra-sec-butoxysilane, tetra-tert-butoxysilane, tetrapentaethoxysilane, tetrapenta-iso-propoxysilane, tetrapenta-n-propoxysilane, tetrapenta-n-butoxysilane, tetrapenta-sec-butoxysilane, tetrapenta-tert-butoxysilane, methyltrimethoxysilane, methyltriethoxysilane, methyltripropoxysilane, methyltributoxysilane, dimethyldimethoxysilane, dimethyldiethoxysilane, dimethylethoxysilane, dimethylmethoxysilane, dimethylpropoxysilane, dimethylbutoxysilane, methyldimethoxysilane, methyldiethoxysilane, and hexyltrimethoxysilane.

Besides the reaction-curable resin, thermoplastic resins may also be used to form the protective diffusion layer 13A, 13B. Examples of thermoplastic resins usable herein include: acrylic resins, such as methyl methacrylate and ethyl methacrylate; polyesters, such as polyethylene terephthalate, polybutylene terephthalate, and polyethylene naphthalate; polyhydrocarbons, such as polycarbonate, polystyrene, polypropylene, and polymethyl pentene; polyamides, such as 6,6-nylon and 6-nylon; saponification products of ethylene-vinyl acetate copolymers; and other thermoplastic resins, such as polyimide, polysulfone, polyvinyl chloride, and acetyl cellulose.

In this embodiment, for the substrate film 11 and the protective diffusion layers 13A, 13B, the following materials were selected from the above-described materials.

A PET film A 4300 (manufactured by Toyobo Co., Ltd.) having a thickness t of 100 μm was used as the substrate film 11.

An ultraviolet-curable resin: RC 19-793 (manufactured by Dainippon Ink and Chemicals, Inc.) was used for the formation of the protective diffusion layers 13A, 13B.

Production Process of Protective Diffusion Film

A protective diffusion film 10 was produced by forming protective diffusion layers 13A, 13B on a substrate film 11.

Figure 3:
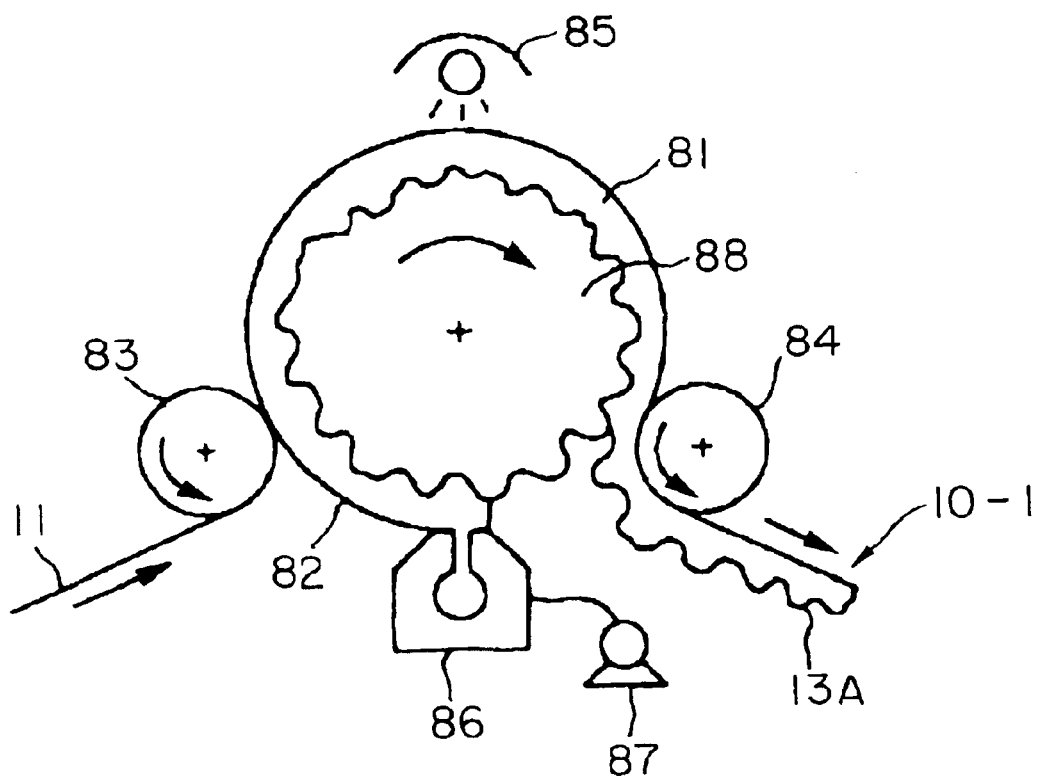
FIG. 3 is a schematic diagram illustrating a process for forming a protective diffusion layer 13A.

FIG. 3 is a schematic diagram illustrating a process for forming a protective diffusion layer 13A. At the outset, an ionizing radiation-curable resin 82 is fed into a die head 86 through a pump 87, and is evenly forced into a cylinder plate 88 having concaves and convexes conforming to fine concaves and convexes on the surface of the protective diffusion layer 13A. After the substrate film 11 in its surface is brought into intimate contact with the cylinder plate 88 by means of an inlet nip 83 (step of shaping), an ionizing radiation is applied to the assembly by an ionizing radiation exposure system 85 (a D-bulb ultraviolet lamp, manufactured by Fusion) to form an ionizing radiation-cured resin 81 and, at the same time, to adhere the substrate film 11 to the ionizing radiation-cured resin 81 (step of curing). Thereafter, at an outlet nip 84, the protective diffusion layer 13A formed on the substrate film 11 is separated from the cylinder plate 88 to form a unfinished film 10-1, which is a form in the course of the formation of a protective diffusion film 10.

The protective diffusion film 10 was prepared by further forming a protective diffusion layer 13B on the film 10-1 in the same manner as described above.

The cylinder plate 88 was prepared by blasting sand of #120 against the surface of a cylindrical iron material to perform sandblasting to form concaves and convexes conforming to the, shape of the surface concaves and convexes. Further, this was finished by electropolishing, and was then plated with chromium for protection.

Surface Light Source Device and Liquid Crystal Display Device

Figure 4:
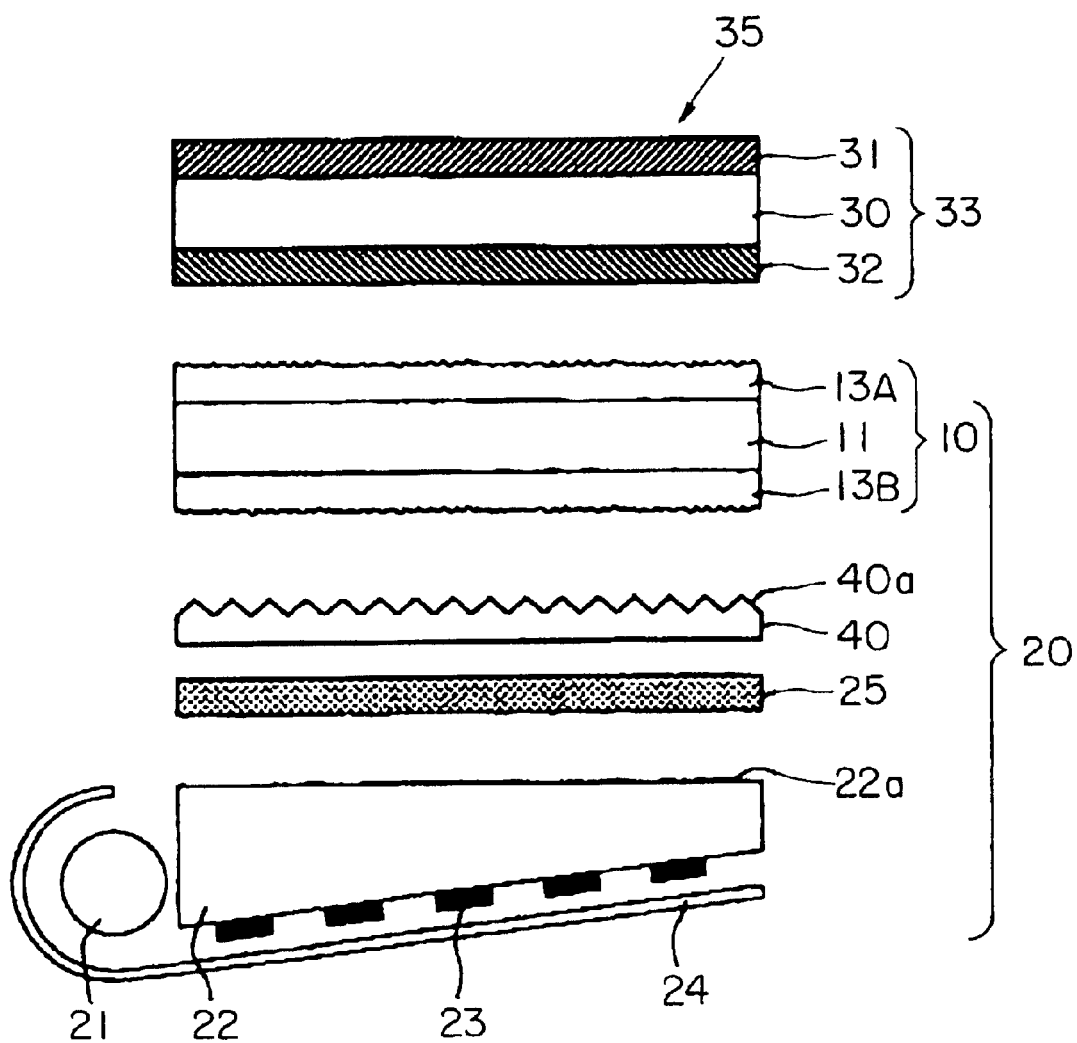
FIG. 4 is a cross-sectional view of a liquid crystal display device 35 provided with a surface light source device 20 using a protective diffusion film 10 according to the first aspect of the present invention.
Figure 5:
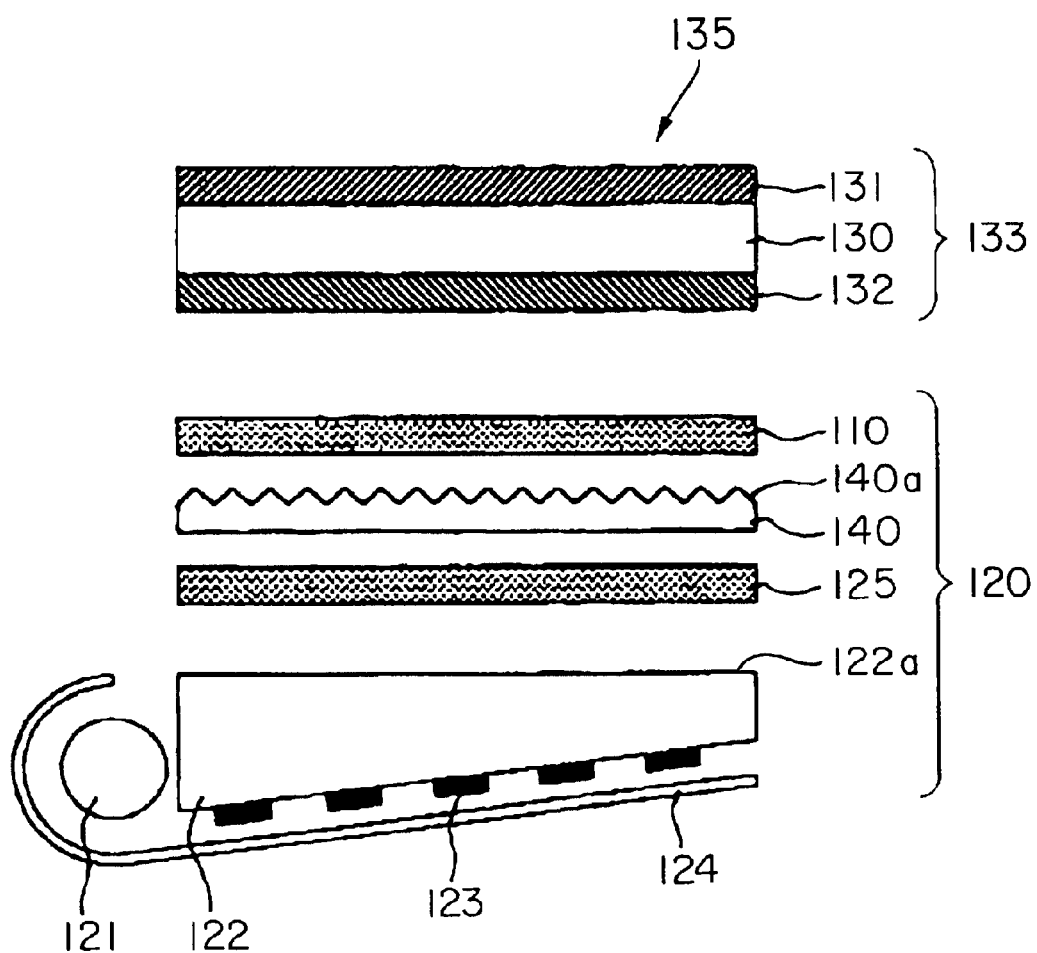
FIG. 5 is a cross-sectional view of a liquid crystal display device 135 provided with a surface light source device 120 using a conventional protective diffusion film 110.

FIG. 4 is a cross-sectional view of a liquid crystal display device 35 provided with a surface light source device 20 using the protective diffusion film 10 according to the embodiment of the present invention.

The surface light source device 20 comprises, for example, a light source 21, a light guide plate 22, a reflection film 24, a light diffusing film 25, a lens film 40, and a protective diffusion film 10.

In the liquid crystal display device 35 provided with the surface light source device 20, all the portions except for the protective diffusion film 10 are the same as those in the liquid crystal display device 135 described above in connection with the prior art, and, thus, the description of overlapped portions will be omitted.

According to this embodiment, a light diffusing film D 121 (manufactured by TSUJIDEN Co., Ltd.) was used as a light diffusing film 25, and BEF 2 (manufactured by Sumitomo 3M Ltd.) was used as a lens film 40.

A protective diffusion film 10 is provided on the light outgoing surface side of the lens film 40 to prevent an unfavorable phenomenon such that, when the prism 40a in the lens film 40 comes into direct contact with the liquid crystal display device 33, for example, due to vibration in transit, the prism 40a and the liquid crystal display device 33 are scratched with each other.

Evaluation Test

The protective diffusion film 10 and the surface light source device 20 using the same thus prepared were evaluated for front luminance and scratch resistance in comparison with those of a conventional product as a comparative example.

In the comparative example, a conventional beads-containing protective diffusion film D 117 U (manufactured by TSUJIDEN Co., Ltd.) was provided instead of the protective diffusion film 10.

As described above, the haze of the protective diffusion film 10 prepared according to the embodiment of the present invention is 30, while the haze of the comparative protective diffusion film D 117 U is 25.

For the front luminance, the luminance of the surface of the surface light source device was measured from a direction normal to the front of each surface light source device by means of a luminance meter BM-7 (angle of visibility 2°) manufactured by Topcon Corp. in such a state that the light source 21 was turned on.

The scratch resistance was evaluated as follows. The protective diffusion films according to the embodiment of the present invention and the comparative example were disposed on the light outgoing surface (prism surface) of the lens film 40. A weight of 20 g (mass) (a load of 0.196 N) was put on an area of 154 mm$^2$ so that the load was evenly applied. The lens film 40 and the protective diffusion film were moved at a relative speed of 100 mm/sec. After that, the surface of the lens film 40 was inspected.

The results of evaluation of the front luminance and the scratch resistance are shown in Table 1.

TABLE 1

| | Front luminance | Scratch resistance |
|---|---|---|
| Embodiment of invention | 2,123 cd/m$^2$ | ○ (Scratch not occurred) |
| Comp. Ex. | 2,116 cd/m$^2$ | X (Scratch occurred) |

As compared with the comparative product, the product according to the embodiment of the present invention did not cause a lowering in front luminance, and the luminance could be slightly improved.

For the comparative product, a large number of fine scratches were observed on the surface of the lens film 40, whereas the product of the embodiment of the present invention had no scratch, that is, had improved scratch resistance.

According to the embodiment of the present invention, the protective diffusion film 10 provided with protective diffusion layers 13A, 13B having fine concaves and convexes on the surface thereof was adopted without the use of beads and the like as the diffusing agent. By virtue of this construction, scratching does not take place in the leans film 40 and the liquid crystal display device 33.

Further, there is no fear of causing the separation of beads and the entry of the separated beads between the prisms 40a in the lens film 40 which causes a change in optical properties and shadow.

Further, the suitable level of light diffusion properties can offer concealment effect and thus can conceal, for example, stripes of the lens film 40.

Protective Diffusion Film According to Second Aspect of Present Invention

The protective diffusion film according to the second aspect of the present invention is partial modification of the protective diffusion film 10 according to the first aspect of the present invention. Therefore, the description of portions common to the first and second aspects of the present invention will be omitted.

The protective diffusion film 10 comprises a substrate film 11 and a first protective diffusion layer 13B and a second protective diffusion layer 13A provided as the protective diffusion layer respectively on both the sides of the substrate film 11.

As with the protective diffusion layers 13A, 13B according to the first embodiment of the present invention, the protective diffusion layers 13A, 13B according to the second embodiment of the present invention have fine concaves and convexes on the surface thereof, protect members which come into contact with the protective diffusion film, and have concealment effect by virtue of a suitable level of diffusion properties. The second embodiment of the present invention, however, is different from the first embodiment of the present invention in that the shape of the surface of the first protective diffusion layer 13B different from that of the second protective diffusion layer 13A in terms of surface roughness and the number of profile peaks.

The surface roughness in terms of ten-point mean roughness Rz of the first protective diffusion layer 13B is Rz=1.6 μm. Further, for the first protective diffusion layer 13B, the roughness in terms of the number of profile peaks PC as measured by the Pc1 method under conditions of longitudinal magnification: 2000 times, lateral magnification: 50 times, reference length: 0.8 mm, phase characteristics: normal, feed rate: 0.1 mm/sec, and count level: ±0.1 μis PC=8.

On the other hand, the surface roughness in terms of ten-point mean roughness Rz of the second protective diffusion layer 13A is Rz=1.6 μm. Further, for the second protective diffusion layer 13A, the roughness in terms of the number of profile peaks PC as measured by the Pc1 method under the same conditions as described above in connection with the first protective diffusion layer 13B is PC=20.

The protective diffusion film 10 according to this embodiment having the above protective diffusion layers 13A, 13B had a haze of 40.

According to the embodiment of the present invention, the haze of the protective diffusion film 10 can be varied by varying only the surface profile of the second protective diffusion layer 13A. Therefore, a protective diffusion film 10 having desired optical properties can be prepared while maintaining a certain level of concealment effect and scratch resistance of the other side of the protective diffusion film 10.

Other Aspects of Present Invention

The present invention is not limited to the above-described embodiments, and various variations and modifications are possible within the scope of the present invention.

Figure 6:
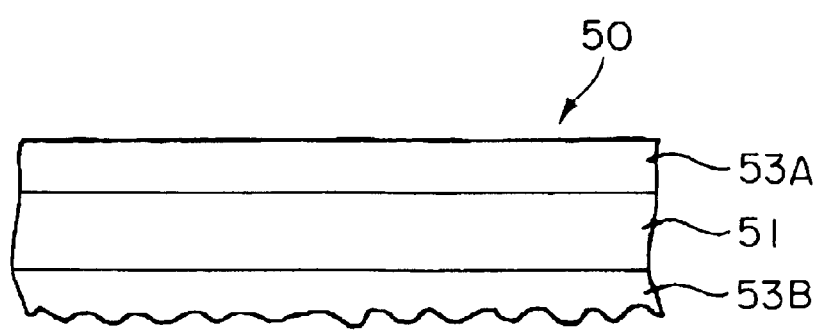
FIG. 6 is a partially enlarged cross-sectional view of a protective diffusion film 50 according to another aspect of the present invention.

For example, in the above embodiments, the protective diffusion layer is provided on both sides of the substrate film. The present invention, however, is not limited to these embodiments only. Specifically, for example, the protective diffusion layer may be provided on the substrate film in its lens film side face (light incidence face) only. Alternatively, as in the case of a protective diffusion film 50 shown in FIG. 6, fine concaves and convexes may be provided on only one (53B) surface of the protective diffusion layer.

In the second embodiment of the present invention, the first protective diffusion layer 13B in the protective diffusion film 10 is disposed on the lens film 40 side. The present invention, however, is not limit to this, and, for example, the second protective diffusion layer 13A may be disposed on the lens film 40 side.

Effect of the Invention

As is apparent from the foregoing detailed description, according to the present invention, the protective diffusion film has a protective diffusion layer having on its surface fine concaves and convexes. Therefore, the protective diffusion film can protect the lens film without any fear of beads scratching the lens film and any change in optical properties derived from the separation of beads from the protective diffusion film.

Further, when the protective diffusion layer has specified surface roughness, the protective diffusion film can have high protective effect and concealment effect.

Further, when the protective diffusion layer has specified light diffusion properties, necessary concealment effect can be ensured without excessive lowering in front luminance.

The protective diffusion film is produced by a production process comprising the steps of: providing a cylinder plate; shaping an ionizing radiation-curable resin into a desired shape; and curing the shaped ionizing radiation-curable resin (roll-to-roll continuous forming by DPS). Therefore, the protective diffusion film can be produced without incurring higher cost than the conventional protective diffusion film.

Therefore, surface light source devices and liquid crystal display devices using the above protective diffusion film are free from scratching caused, for example, by vibration in transit, and, thus, the reliability can be further enhanced.

What is claimed is:

1. A protective diffusion film for use in a surface light source device provided with a lens film, wherein said protective diffusion film is provided on a light outgoing surface of the lens film, said protective diffusion film comprising:
   a transparent substrate layer; and
   a protective diffusion layer that is provided on the transparent substrate layer in its surface at least on the lens film side, has fine concaves and convexes on its surface, protects members that come into contact with the protective diffusion film, and is light diffusive, the protective diffusion film having a haze of 15 to 50.

2. A protective diffusion film for use in a surface light source device provided with a lens film, wherein said protective diffusion film is provided on a light outgoing surface of the lens film, said protective diffusion film comprising:
   a transparent substrate layer; and
   a protective diffusion layer that is provided on the transparent substrate layer in its surface at least on the lens film side, has fine concaves and convexes on its surface, protects members that come into contact with the protective diffusion film, and is light diffusive, wherein the surface of the protective diffusion layer has a ten-point mean roughness Rz of 0.5 to 6 $\mu$m.

3. A protective diffusion film for use in a surface light source device provided with a lens film, wherein said protective film is provided on a light outgoing surface of the lens film, said protective diffusion film comprising:
   a transparent substrate layer; and
   a protective diffusion layer that is provided on the transparent substrate layer in its surface at least on the lens film side, has fine concaves and convexes on its surface, protects members that come into contact with the protective diffusion film, and is light diffusive, wherein the number of profile peaks in the concaves and convexes in the protective diffusion layer is 2 to 15 as measured under conditions of a reference length of 0.8 mm and a count level of ±0.1 $\mu$m.

4. The protective diffusion film according to claim 3, wherein the number of profile peaks is counted by a Pc1 method.

5. A protective diffusion film for use in a surface light source device provided with a lens film, wherein said protective diffusion film is provided on a light outgoing surface of the lens film, said protective diffusion film comprising:
   a transparent substrate layer; and
   a protective diffusion layer that is provided on the transparent substrate layer in its surface at least on the lens film side, has fine concaves and convexes on its surface, protects members that come into contact with the protective diffusion film, and is light diffusive, wherein the protective diffusion layer contains a cured product of an ionizing radiation-curable resin.

6. A protective diffusion film for use in a surface light source device provided with a lens film, wherein said protective diffusion film is provided on a light outgoing surface of the lens film, said protective diffusion film comprising:
   a transparent substrate layer;
   a first protective diffusion layer that is provided on the transparent substrate layer in its surface on the lens film side, has fine concaves and convexes on its surface, protects members that come into contact with the protective diffusion film, and is light diffusive; and
   a second protective diffusion layer that is provided on the transparent substrate layer in its side remote from the first protective diffusion layer, has fine concaves and convexes on its surface, protects members that come into contact with the protective diffusion film, and is light diffusive, the protective diffusion film having a haze of 15 to 50.

7. A protective diffusion film for use in a surface light source device provided with a lens film, wherein said protective diffusion film is provided on a light outgoing surface of the lens film, said protective diffusion film comprising:

a transparent substrate layer;

a first protective diffusion layer that is provided on the transparent substrate layer in its surface on the lens film side, has fine concaves and convexes on its surface, protects members that come into contact with the protective diffusion film, and is light diffusive; and a second protective diffusion layer that is provided on the transparent substrate layer in its side remote from the first protective diffusion layer, has fine concaves and convexes on its surface, protects members that come into contact with the protective diffusion film, and is light diffusive, wherein the surface of the first protective diffusion layer and/or the surface of the second protective diffusion layer have a ten-point mean roughness Rz of 0.5 to 6 μm.

8. A protective diffusion film for use in a surface light source device provided with a lens film, wherein said protective diffusion film is provided on a light outgoing surface of the lens film, said protective diffusion film comprising:

a transparent substrate layer;

a first protective diffusion layer that is provided on the transparent substrate layer in its surface on the lens film side, has fine concaves and convexes on its surface, protects members that come into contact with the protective diffusion film, and is light diffusive; and a second protective diffusion layer that is provided on the transparent substrate layer in its side remote from the first protective diffusion layer, has fine concaves and convexes on its surface, protects members that come into contact with the protective diffusion film, and is light diffusive, wherein the number of profile peaks in the concaves and convexes in the first protective diffusion layer or the second protective diffusion layer is 2 to 15 as measured under conditions of a reference length of 0.8 mm and a count level of ±0.1 μm.

9. The protective diffusion film according to claim 8, wherein the number of profile peaks in the concaves and convexes in the second protective diffusion layer or the first protective diffusion layer provided on the side opposite to the first protective diffusion layer or the second protective diffusion layer is 10 to 40 as measured under conditions of a reference length of 0.8 mm and a count level of ±0.1 μm.

10. The protective diffusion film according to claim 8, wherein the number of profile peaks is counted by a Pc1 method.

11. A protective diffusion film for use in a surface light source device provided with a lens film, wherein said protective diffusion film is provided on a light outgoing surface of the lens film, said protective diffusion film comprising:

a transparent substrate layer;

a first protective diffusion layer that is provided on the transparent substrate layer in its surface on the lens film side, has fine concaves and convexes on its surface, protects members that come into contact with the protective diffusion film, and is light diffusive; and a second protective diffusion layer that is provided on the transparent substrate layer in its side remote from the first protective diffusion layer, has fine concaves and convexes on its surface, protects members that come into contact with the protective diffusion film, and is light diffusive, wherein the protective diffusion layer contains a cured product of an ionizing radiation-curable resin.

12. A process for producing the protective diffusion film according to claim 5 or 11, comprising the steps of:

shaping the ionizing radiation-curable resin into a desired shape by means of a cylinder plate having a mold shape conforming to the shape of said concaves and convexes (step of shaping); and applying an ionizing radiation to the ionizing radiation-curable resin to form a cured product of the ionizing radiation-curable resin (step of curing).

13. A surface light source device comprising:

a light source;

surface light projection means for surface-projecting light, emitted from the light source, from a light projection surface to a predetermined direction;

a lens film provided on the light projection surface; and the protective diffusion film, according to any one of claims 1 to 5 and 6 to 11, provided on the light outgoing surface side of the lens film.

14. A liquid crystal display device comprising:

a light source;

surface light projection means for surface-projecting light, emitted from the light source, from a light projection surface to a predetermined direction;

a lens film provided on the light projection surface;

the protective diffusion film, according to any one of claims 1 to 5 and 6 to 11, provided on the light outgoing surface side of the lens film; and a transmission liquid crystal display device disposed on the light outgoing surface side of the protective diffusion film.

* * * * *